United States Patent [19]

Steward

[11] 3,966,525

[45] June 29, 1976

[54] METHOD OF MAKING HELICALLY WOUND PLASTIC TUBING

[75] Inventor: William L. Steward, Costa Mesa, Calif.

[73] Assignee: Steward Plastics, Inc., Santa Ana, Calif.

[22] Filed: Apr. 28, 1975

[21] Appl. No.: 572,389

Related U.S. Application Data

[60] Division of Ser. No. 469,234, May 13, 1974, Pat. No. 3,910,808, which is a continuation of Ser. No. 284,944, Aug. 30, 1972, abandoned.

[52] U.S. Cl. ............................... 156/195; 156/244
[51] Int. Cl.² ........................................ B65H 81/00
[58] Field of Search .................. 156/428, 143–144, 156/195, 244; 285/3, 226, DIG. 4; 138/121–122

[56] References Cited

UNITED STATES PATENTS

| | | | |
|---|---|---|---|
| 3,243,328 | 3/1966 | Britton et al. | 156/244 X |
| 3,640,312 | 2/1972 | Bauman et al. | 156/244 X |
| 3,758,139 | 9/1973 | Meserole | 285/DIG. 4 |

Primary Examiner—William A. Powell
Assistant Examiner—David A. Simmons
Attorney, Agent, or Firm—Harris, Kern, Wallen & Tinsley

[57] ABSTRACT

An apparatus for making helically wound and helically ribbed plastic tubing, comprising: means for extruding a plastic strip having a longitudinal rib; winding means for helically winding the strip about an axis into a tube with one edge of each convolution overlapping and heat bonded to an edge of a preceding convolution and with the rib of the exterior of the tube, the winding means comprising four cantilevered rolls uniformly circumferentially spaced apart around and extending in the direction of the axis and canted relative to the axis at acute angles, opposite rolls being oppositely canted; and means for driving the rolls. The apparatus further includes means for applying a coolant to the tube externally and internally thereof to cool the plastic material after the convolutions of the tube have been heat bonded together. The apparatus further includes a roller engageable with the helical rib on the tube opposite one of the rolls to flatten the rib in zones where it is desired to sever the tube into shorter lengths and to provide such shorter lengths with smooth ends.

1 Claim, 8 Drawing Figures

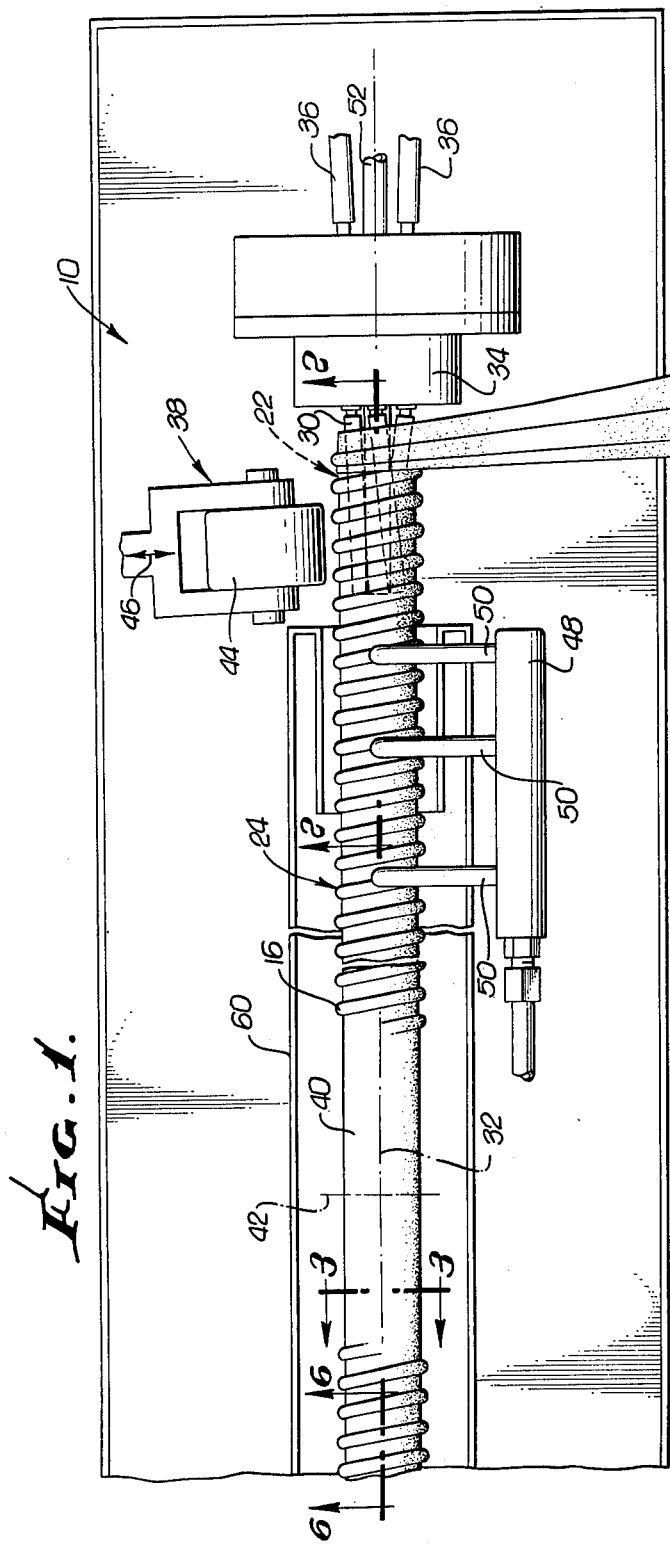
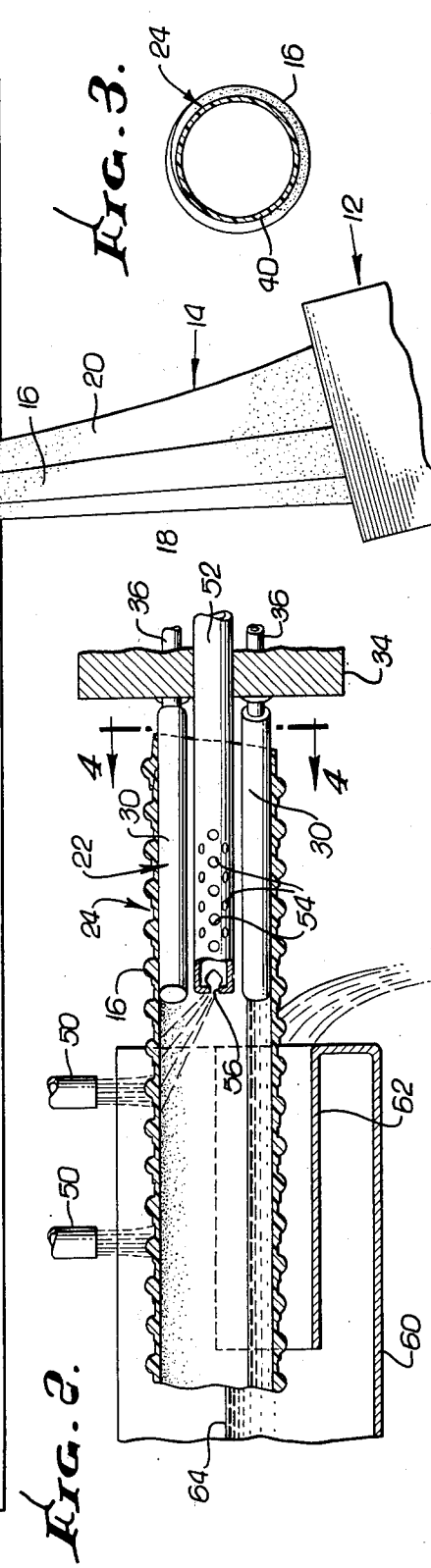

METHOD OF MAKING HELICALLY WOUND PLASTIC TUBING

This is a division of application Ser. No. 469,234, filed May 13, 1974, now U.S. Pat. No. 3,910,808, the latter being a continuation of Ser. No. 284,944 filed Aug. 30, 1972, and now abandoned.

BACKGROUND OF INVENTION

The present invention relates in general to plastic tubing and, more particularly, to an apparatus for making helically wound and helically ribbed plastic tubing.

Still more particularly, the invention contemplates an apparatus which includes means for extruding a plastic strip having a longitudinal rib on one side thereof, and which includes winding means for helically winding the ribbed strip about an axis into a tube with one edge of each convolution overlapping and heat bonded to an edge of a preceding convolution. The apparatus also includes means for cooling the tube both internally and externally after heat bonding of adjacent convolutions has been completed.

Any suitable heat bondable plastic may be used. As examples, the invention may utilize such thermoplastics as polyethylene, polyvinyl chloride, or the like.

Britton et al U.S. Pat. No. 3,122,171, issued Feb. 25, 1964, discloses a conventional helically wound and helically ribbed plastic tubing of the foregoing general nature, while Britton et al U.S. Pat. Nos. 3,243,328 and 3,301,734, respectively issued Mar. 29, 1966 and Jan. 31, 1967, respectively disclose a prior method and a prior apparatus of making plastic tubing of this nature.

SUMMARY AND OBJECTS OF INVENTION

The primary object of the invention is to provide an apparatus of the foregoing general type which includes a very simple and effective winding means and one which automatically discharges the resulting tube in the axial direction, thereby eliminating any necessity for any auxiliary takeoff means.

More particularly, an important object of the invention is to provide a winding means which comprises rolls uniformly circumferentially spaced apart around and extending in the direction of the axis and canted relative to the axis at acute angles in the range of a few degrees. Still more particularly, an object is to provide a winding means which includes four such rolls with opposite rolls being oppositely canted.

Yet another object of the invention is to provide an apparatus wherein the extruded strip is longitudinally ribbed to provide the resulting tube with an external helical rib, the apparatus including a roller engageable with such helical rib opposite one of the winding rolls to flatten the rib in desired zones. The tube can be cut into shorter lengths in the zones where the external rib is flattened to provide such shorter lengths with smooth ends. Such smooth ends facilitate connections to fittings of oxygen equipment in hospitals, but may be provided wherever they are necessary or desirable.

The foregoing objects, advantages, features and results of the present invention, together with various other objects, advantages, features and results thereof which will be evident to those skilled in the helically wound plastic tubing art in the light of this disclosure, may be achieved with the exemplary embodiment of the invention illustrated in the accompanying drawings and described in detail hereinafter.

DESCRIPTION OF DRAWINGS

In the drawings:

FIG. 1 is a plan view of an apparatus of the invention for making helically wound and helically ribbed plastic tubing;

FIG. 2 is an enlarged, fragmentary longitudinal sectional view taken as indicated by the arrowed line 2—2 of FIG. 1;

FIG. 3 is a transverse sectional view taken as indicated by the arrowed line 3—3 of FIG. 1;

DESCRIPTION OF EXEMPLARY EMBODIMENT OF THE INVENTION

Figure 4:
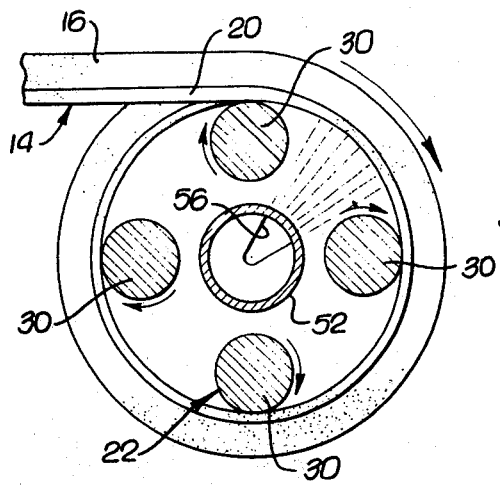
FIG. 4 is an enlarged, transverse sectional view taken as indicated by the arrowed line 4—4 of FIG. 2.

The apparatus of the invention is designated generally by the numeral 10 and includes means 12, FIG. 1, for extruding a heat bondable, and preferably thermoplastic, strip 14 having a longitudinal rib 16 with longitudinal flanges 18 and 20 on opposite sides thereof. The extruded plastic strip 14 is fed to a winding means 22 of the invention which will be described in detail hereinafter and which winds the strip 14 into a tube 24 with one edge of each convolution overlapping and heat bonded to an edge of a preceding convolution. More particularly, the winding means 22 causes the flange 18 to overlap and heat bond to the flange 20 throughout each convolution.

Figure 6:
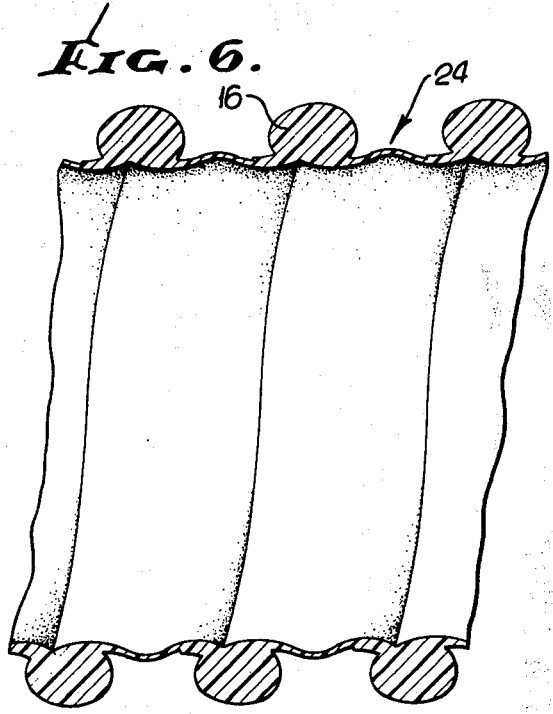
FIG. 6 is a fragmentary longitudinal sectional view showing the tubing of the invention in a straight condition.
Figure 7:
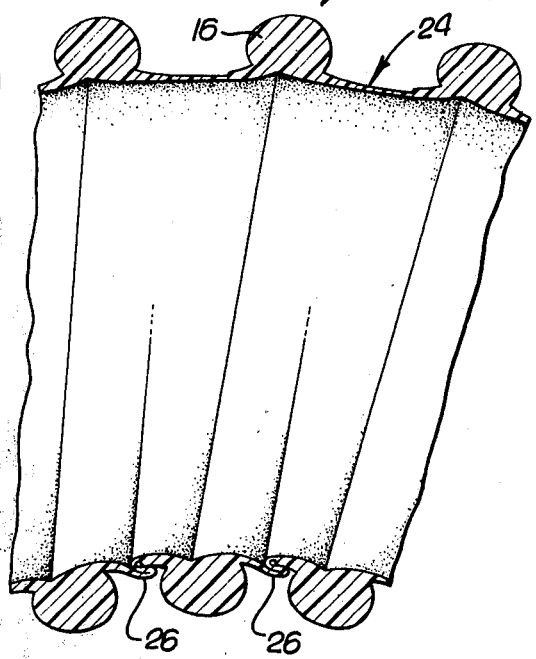
FIG. 7 is a view similar to FIG. 6, but showing the tubing in a bent condition.
Figure 8:
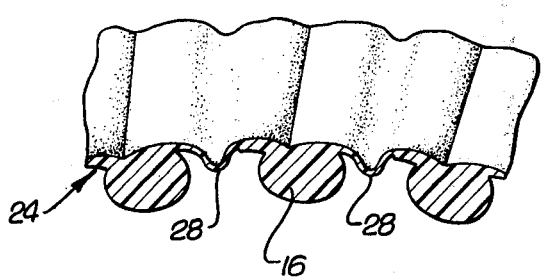
FIG. 8 is a fragmentary sectional view showing a condition intermediate the straight condition of FIG. 6 and the bent condition of FIG. 7.

The resulting tube 24 is shown in more detail in FIGS. 6 to 8, FIG. 6 showing the tube in a straight condition. FIG. 7 shows how the tube 24 may be bent to a relatively small radius, buckles 26 forming on the inner side of the bend. FIG. 8 shows the tube 24 bent to a lesser degree than FIG. 7, there being smaller buckles 28 on the inner side of the bend.

Considering the winding means 22 of the invention in more detail now, it includes four cantilevered winding rolls 30 circumferentially spaced apart around and extending in the direction of the axis 32 of the winding means, which axis coincides with the axis of the tube 24. Preferably, the rolls 30 are spaced uniformly about the axis 32. The cantilevered ends of the winding rolls 30 are carried by suitable bearings, not shown, in a supporting head 34. Shafts 36 on the opposite side of the supporting head 34 are connected to the respective winding rolls 30 to drive them all in the same direction, as indicated by the rotational arrows in FIG. 4 of the drawings. These shafts 36 may be driven in any suitable manner, not shown. While the rolls 30 are shown cantilevered, they may be supported at both ends if desired.

Figure 5:
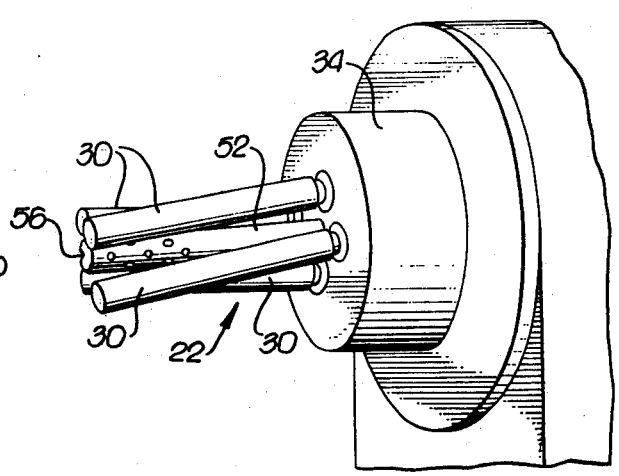
FIG. 5 is a fragmentary perspective view showing the winding means of the apparatus of the invention.

The winding rolls 30 are all canted relative to the axis 32 at acute angles in the range hereinbefore mentioned. More particularly, opposite rolls 30 are oppositely canted. This will be clear from FIG. 5 of the drawings, which shows the front and rear rolls 30 canted in opposite directions relative to each other, and shows the top and bottom rolls 30 canted in opposite directions relative to each other.

With the foregoing construction, the winding rolls 30 drive the tube 24 frictionally to draw the strip 14 from the extruding means 12 and wind it around the previously wound convolution, as will be clear from FIGS. 1 and 4 in particular. The canting of the winding rolls 30 causes the tube 24 to move continuously off the winding means 22, i.e., to move continuously to the left, as viewed in FIGS. 1 and 2. This is an important feature of the invention since the canted winding rolls 30 thus perform the dual function of winding the strip 14 into the tube 24, and simultaneously displacing the tube off the winding means. Thus, there is no necessity for separate winding and takeoff means, which is an important feature.

The apparatus 10 includes means 38 for flattening the external rib 16 on the tube 24 wherever desired, as in the zone 40 of FIG. 1, for example. If the tube 24 is cut in the zone 40, as at 42, to provide a shorter tube length, the tube ends on both sides of he cut 42 are smooth externally. This facilitates connecting such tube ends to equipment with which the tube lengths are to be used, and also thickens the tube ends for added strength.

The flattening means 38 comprises a flattening roller 44 located externally of the tube 24 adjacent the winding means 22, the roller being located opposite one of the winding rolls 30 and having its axis of rotation parallel to the axis of that winding roll. The roller 44 may be moved into engagement with the external rib 16 on the tube 24 to flatten same by any suitable means, designated schematically by the double headed arrow 46.

To cool and set the plastic material after heat bonding of the adjacent convolutions of the strip 14, a suitable coolant, such as water, is applied to the tube both externally and internally. For external application of cooling water, a manifold 48 is located adjacent the tube 24 downstream from the winding means 22 and is provided with arms 50 which discharge cooling water onto the top of the tube, as best shown in FIGS. 1 and 2 of the drawings.

For internal cooling of the tube 24, a conduit 52 extends through the supporting head 34 along the axis 32 and is surrounded by the winding rolls 30. This conduit is provided within the winding means 22 with lateral spray openings 54 which spray cooling water directly on the interior of the tube 24 between the winding rolls 30. The conduit 52 is provided at its downstream end with a downstream directed spray opening 56 which, in addition to cooling the tube 24, assists in discharging it from the winding means 22. The coolant also prevents the plastic from sticking to the rolls 30.

The tube 24 is discharged into a trough 60 which collects the externally and internally applied coolant, the internally applied coolant escaping from the tube when it is cut into shorter lengths. The trough 60 is provided with an overflow 62 which has the effect of maintaining the coolant level in the trough at about the level 64. The coolant in the trough 60 buoys up the tube 24 to enable it to come off the winding rolls 30 freely and to rotate about its axis freely with little friction.

Thus, the present invention provides a very simple and effective apparatus 10 for making helically wound plastic tubing, and one which is capable of a high rate of production with minimum attention and maintenance. Further, the rolls 30 provide the tubing with a relatively smooth interior.

Although an exemplary embodiment has been disclosed for purposes of illustration, it will be understood that various changes, modifications and substitutions may be incorporated in such embodiment without departing from the spirit of the invention as defined by the claims hereinafter appearing.

I claim as my invention:

1. A method of making helically externally ribbed plastic tubings having externally smooth, thickened end fittings, including the steps of:
    a. continuously extruding a plastic strip with a longitudinal rib;
    b. continuously helically winding said strip into a tube, at a winding location on the axis of said tube, with said rib externally of said tube and with one edge of each convolution of said strip overlapping an edge of a preceding convolution;
    c. periodically flattening the external rib, at a flattening location adjacent but spaced downstream from said winding location in the direction of the axis of said tube, to provide said tube with longitudinally spaced, externally smooth portions of increased wall thickness compared to the interrib portions of said tube; and
    d. thereafter periodically cutting said tube transversely, at a cutting location spaced downstream from said flattening location in the direction of the axis of said tube, intermediate the ends of said externally smooth portions to provide externally helically ribbed tubings having externally smooth, thickened end fittings.

* * * * *